United States Patent [19]

Swindler et al.

[11] Patent Number: 6,028,765
[45] Date of Patent: Feb. 22, 2000

[54] REMOVABLE HAND-GRIPS FOR A PORTABLE PEN-BASED COMPUTER

[75] Inventors: Danny Swindler, Austin, Tex.; Brian Groh, Glen Morris, Canada

[73] Assignee: Xplore Technologies, Inc., Mississauqua, Canada

[21] Appl. No.: 09/063,322

[22] Filed: Apr. 20, 1998

Related U.S. Application Data

[63] Continuation-in-part of application No. 08/878,758, Jun. 19, 1997.
[51] Int. Cl.[7] .................................................. G06F 1/16
[52] U.S. Cl. ...................... 361/683; 361/726; 312/223.2; 174/138 G
[58] Field of Search ................................... 361/683, 726, 361/679; 312/244, 223.2, 223.1; 248/609, 222.11, 634, 918, 633, 205.5, 206.1; 174/138 G; 206/305

[56] References Cited

U.S. PATENT DOCUMENTS

| 4,456,315 | 6/1984 | Markley et al. | 248/918 |
| 4,468,841 | 9/1984 | Herington | 361/683 |
| 5,002,184 | 3/1991 | Lloyd | 206/305 |
| 5,134,245 | 7/1992 | Katz | 361/683 |
| 5,401,091 | 3/1995 | Landry | 312/223.1 |

*Primary Examiner*—Leo P. Picard
*Assistant Examiner*—Lisa Lea-Edmonds
*Attorney, Agent, or Firm*—Hamman & Benn

[57] ABSTRACT

A pen-based portable computer, or pen-tablet computer, for use with a vehicular docking station that allows for the exchange or replacement of components thereof without the need for returning the computer to the manufacturer, is provided with exterior, removable grips that not only provide a gripping function, but also provide shock-absorption and protection exteriorly of the computer-housing. Each grip may be selectively removed from attachment to the computer-housing, in order to allow access to the interior of the housing for repair and maintenance. Four such removable grips are provided, where each grip is provided with an actuable lever for removably locking the grip to a portion of the computer housing, with each actuable lever being capable of movement away from such locking engagement in order to allow removal thereof from the housing.

32 Claims, 5 Drawing Sheets

REMOVABLE HAND-GRIPS FOR A PORTABLE PEN-BASED COMPUTER

CROSS REFERENCE TO RELATED APPLICATION

The present application is a continuation-in-part of commonly-owned, copending application Ser. No. 08/878,758, filed on Jun. 19, 1997.

BACKGROUND OF THE INVENTION

In commonly-owned, copending application Ser. No. 08/878,758 there is disclosed a portable, pen-based computer for use in a vehicle, or what is typically called "Pen Tablet Computer". Portable, pen-based computers are currently used in the utility industry by salesmen and representatives. A pen-based computer is desirable in the utility industry since the software typically used are forms that must be filled; thus, the easiest and simplest way for the salesman or representative to complete the form is by means of a pen stylus device and/or by touch, such as a touch screen. Any industry where its representatives typically use forms-software that must be filled out is capable of using the pen-based computer, such as the public-safety departments of cities and states, the agricultural and transportation industries, and insurance adjusters.

The portable, pen-based computer of commonly-owned, copending application Ser. No. 08/878,758 is provided with four outer handle-grips which not only provide a means for grasping the portable computer, but also provide a sealing function by clamping together the upper and lower casing sections of the portable computer, and, also, provide shock-absorbing qualities, so as to absorb impacts if the portable computer should be dropped. In conventional, portable computers, the shock-absorption and protection for the computer is provided interiorly via various, internal-component mounting schemes using foams, frames, etc., and ignore the exterior of the computer housing. The theory is to protect the internal components before they experience any external pressures due to drops, bumps, knocks, shocks, vibration, environmental challenges, etc. In general, prior-art products approach shock-protection from the inside out. They use different internal component mounting schemes which involve metal brackets, foams, gels, tape, etc. to provide shock absorption. In some instances, an external shield is provided by enclosing the entire computer in a rubberized external "boot" or cover. This is often implemented after the product has been released and is in affect a rubber carrying case or cover. This is not considered part of the design, but rather an accessory or peripheral.

In the external grips for the housing of a portable computer according to the present invention, if the portable computer is dropped on any of its axis, including front and back, the first thing to hit the surface or feel the bump, knock, etc., is one of the surface faces or edges of the grips, thereby providing shock-absorption and protection from exteriorly of the housing.

SUMMARY OF THE INVENTION

It is the primary objective of the present invention to provide a pen-based portable computer, or pen-tablet computer, such as that used with a vehicular docking station, with exterior, removable grips that not only provide a gripping function, but also provide shock-absorption and protection exteriorly of the computer-housing.

It is another objective of the present invention to provide such removable grips for a portable, pen-tablet computer that allows each grip to be selectively removed from attachment to the computer-housing, in order to allow access to the interior of the housing for repair and maintenance.

It is still another objective of the present invention to provide four such removable grips for a portable, pen-tablet computer housing, where each grip is provided with an actuable lever for removably locking the grip to a portion of the computer housing, with each actuable lever being capable of movement away from such locking engagement in order to allow removal thereof from the housing.

BRIEF DESCRIPTION OF THE DRAWINGS

The invention will be more readily understood with reference to the accompanying drawing, wherein.

DETAILED DESCRIPTION OF THE INVENTION

Figure 1:
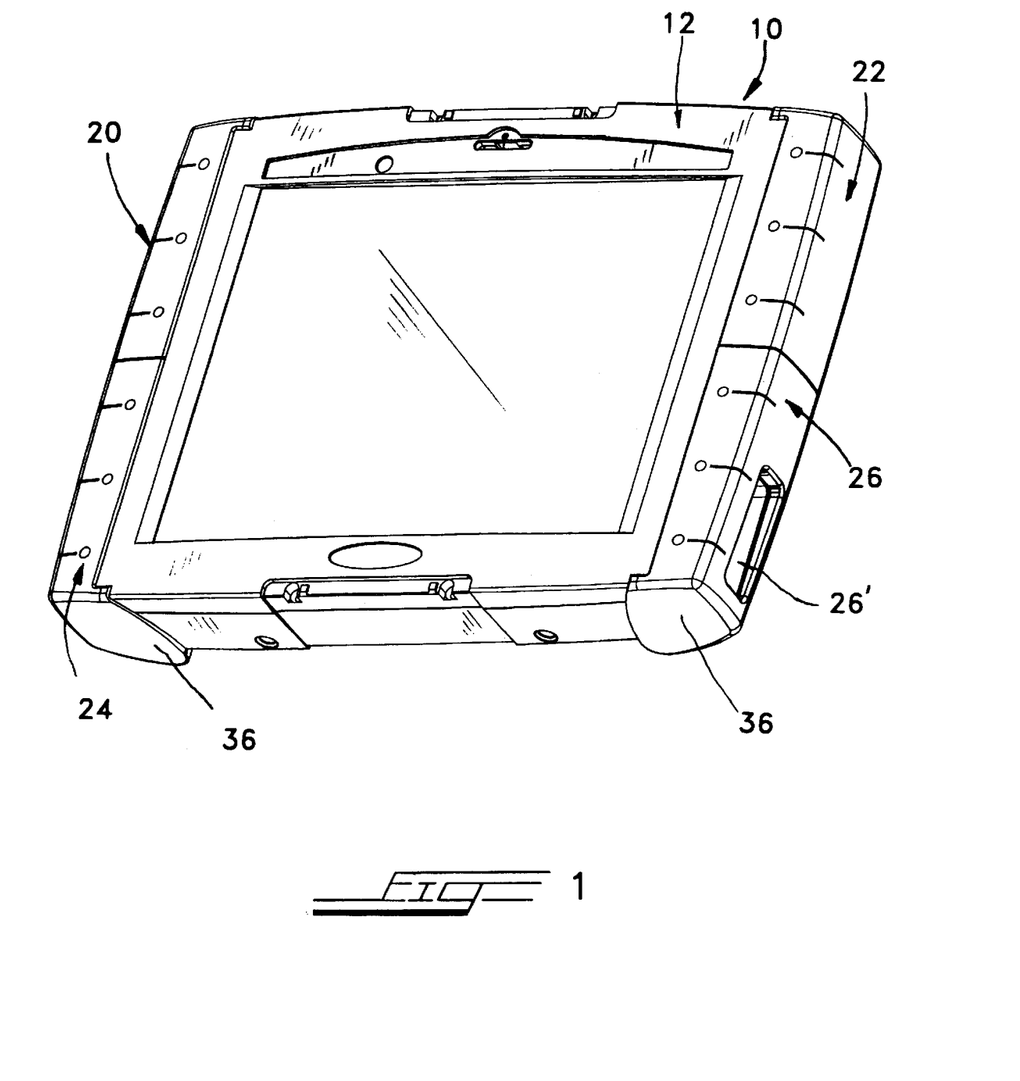
FIG. 1 is an isometric view of the portable computer with removable, outer grips of the invention for providing exterior shock-absorption and protection.
Figure 2:
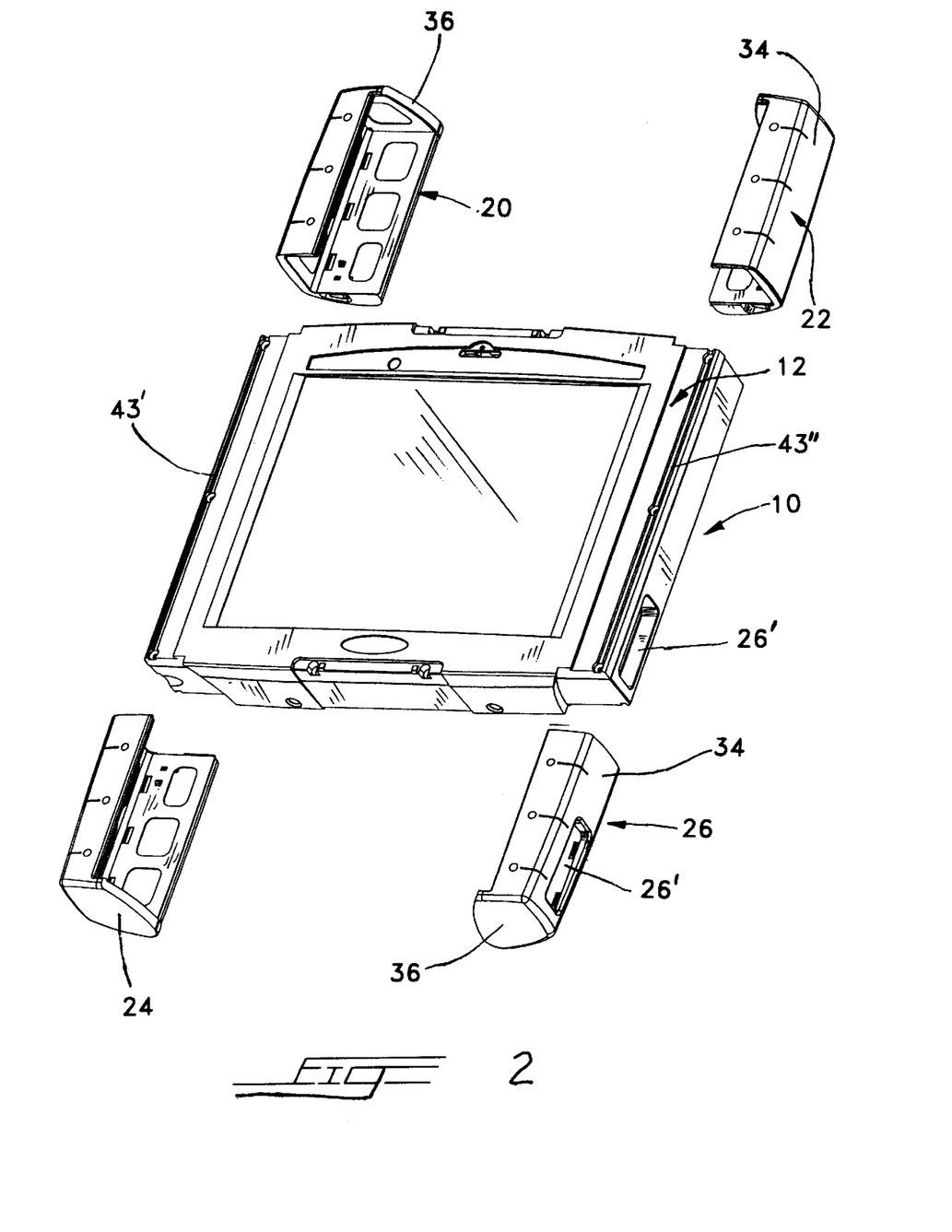
FIG. 2 is an isometric assembly view thereof.

Referring now to the drawings in greater detail, there is shown a portable, pen-based computer tablet 10, such as that disclosed is commonly-owned, copending Ser. No. 08/878,758, which portable computer may be used with a vehicular docking station, as set forth in said copending application. The portable, pen-based computer tablet 10 is typically made up of a housing 12 made of aluminum or magnesium, and consisting of an upper section and a lower section secured together by screws. The upper and lower housing sections are also held together by means of a plurality of grips or mounting brackets of the invention. There are two upper, lateral grips, 20, 22, and two lower, lateral mounting brackets, or grips, 24, 26, each of U-shaped cross section, and each substantially the same, except for handedness, and except for the lower-right grip 26 which is provided with a central cutout 26' for allowing access to the power harness of the housing of the computer. The power harness contains an on/off toggle switch, reset button and AC/DC power receptacle, so that the user can interface with the various power-harness elements.

Figures 3, 4:
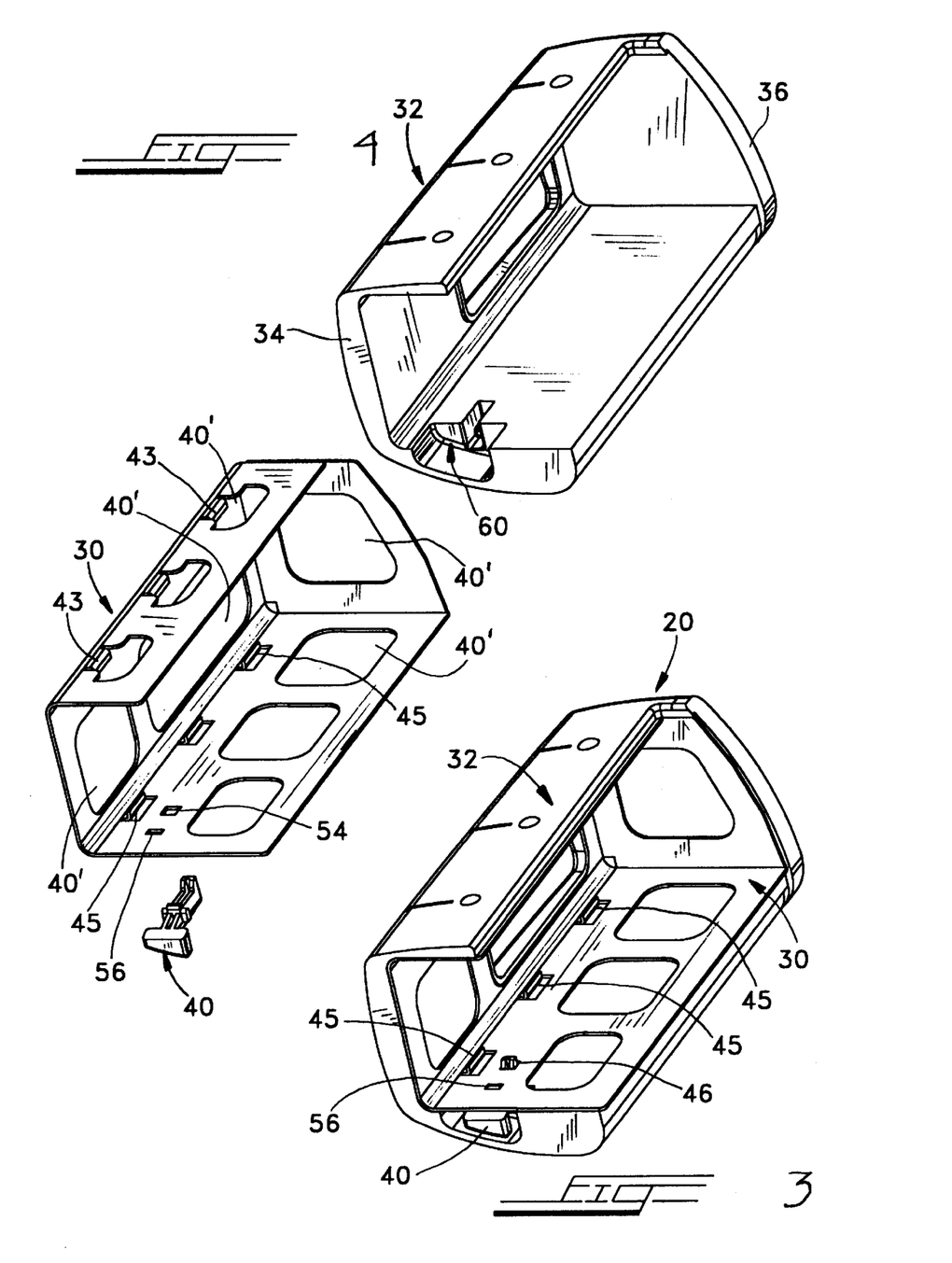
FIG. 3 is an isometric view of one of the removable, exterior grips.
FIG. 4 is an isometric assembly view of a removable, exterior grip.
Figures 5, 6:
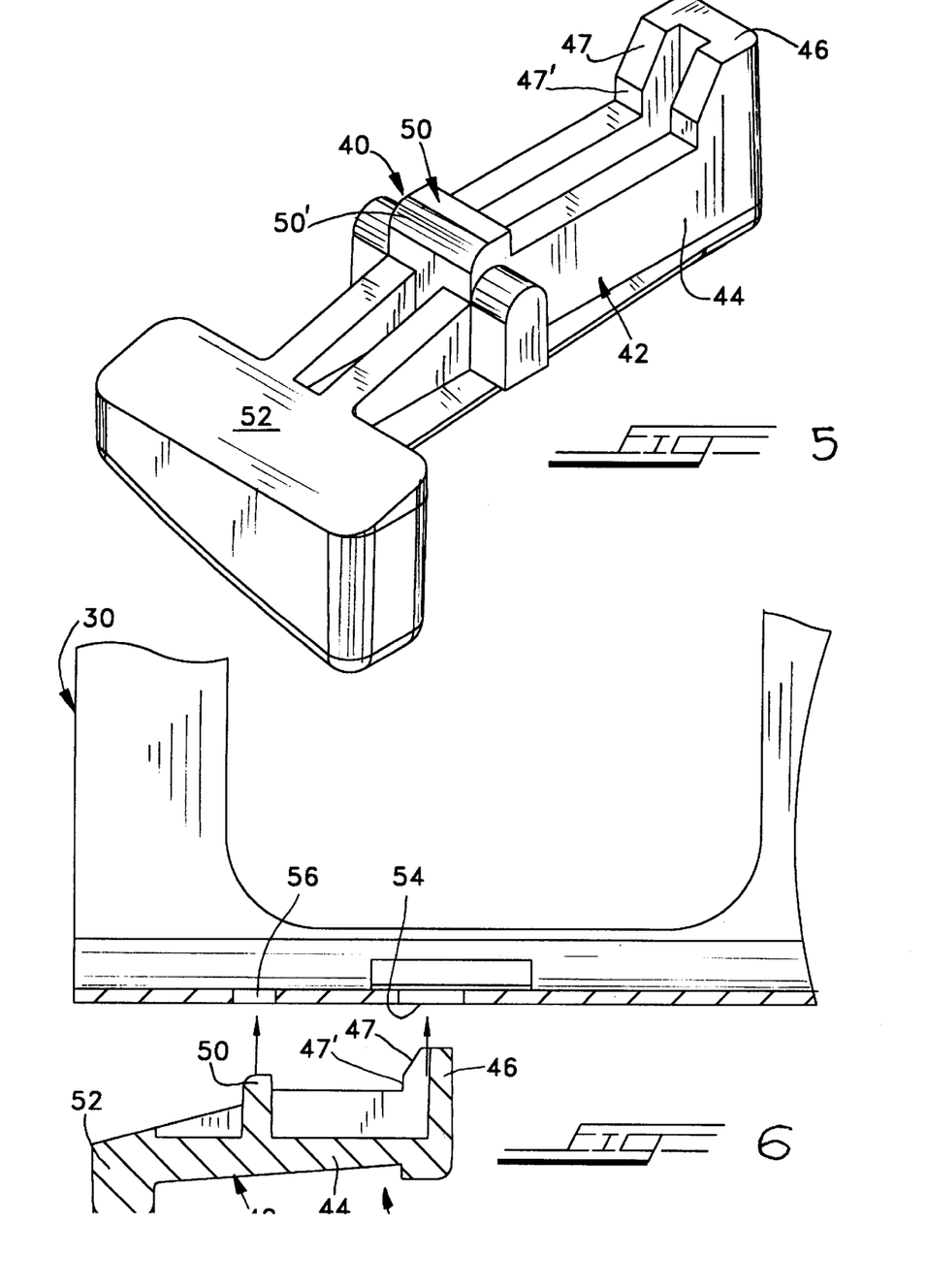
FIG. 5 is an isometric view of the a locking lever for removably locking a grip to a portion of the computer-housing.
FIG. 6 is an assembly view, in partial cross section, showing the assembly of a locking lever to an exterior, removable grip.

Referring now to FIGS. 3 and 4, each grip 20–26 consists of two parts: An internal sheet metal frame 30, which provides structural support and the guiding mechanism for the grip as described hereinbelow, and, a rubber over-mold, or neoprene outer shell, 32 which fits over the sheet metal frame 30. The internal sheet metal frame is designed specifically to mate with the rubber over-mold, and to slide onto the computer-housing. Each rubber over-mold is constructed of high-impact resistant, durable Neoprene material. When assembled, each grip 20–26 defines a slight, outwardlycurving or convex-shaped exterior side surface 34, which provides shock-dissipation characteristics, as well as ergonomic benefits. The convex-shaped exterior surface dissipates any force thereon so that it is not concentrated at any one location, when the computer 10 is dropped on a surface. Each grip also has a slightly convex-shaped exterior end-surface 36 which also provides the same shock-dissipation characteristics. Each side of the computer 10 has a grip projecting beyond a corresponding edge-surface of housing, whereby when the computer is dropped, only the projecting portion of a grip will contact the floor or ground during impact. The inner sheet metal frame 30 of each grip 20–26 is provided with a series of cutouts 40' formed during the sheet-metal processing, in order to provide a lighter-weight grip. The grips also provide a perfect gripping mechanism or handle when the unit is being used in a mobile application. The user can easily grasp any of the grips to provide a solid, non-slippery hold on the unit. In addition, computer 10 is being mounted in a vehicle docking system or desk top dock, the grips provide a perfect interface for seating the unit in the various docks, as described in commonly-owned, copending application Ser. No. 08/878,758. The grips provide a further sealing and locking mechanism to ensure that the upper and lower housing sections are securely and reliably fastened and sealed. The grips lock into place when they are attached, and offer unprecedented security for the internal components.

The upper, left grip 20 is a solid grip which slides onto the upper left corner of the case. The lower, left grip 24 is the same as grip 20. When grip 24 is removed, a metal, battery door of the computer-housing is exposed, which door provides a cover for the battery compartment of the computer. When the battery door is removed, the battery compartment is exposed. The upper, right grip 22 is the same as grip 20, except for handedness since it is positioned in the upper right corner. The lower, right grip 26, as described above, is different in that it has the cutout 26'.

Figure 7:
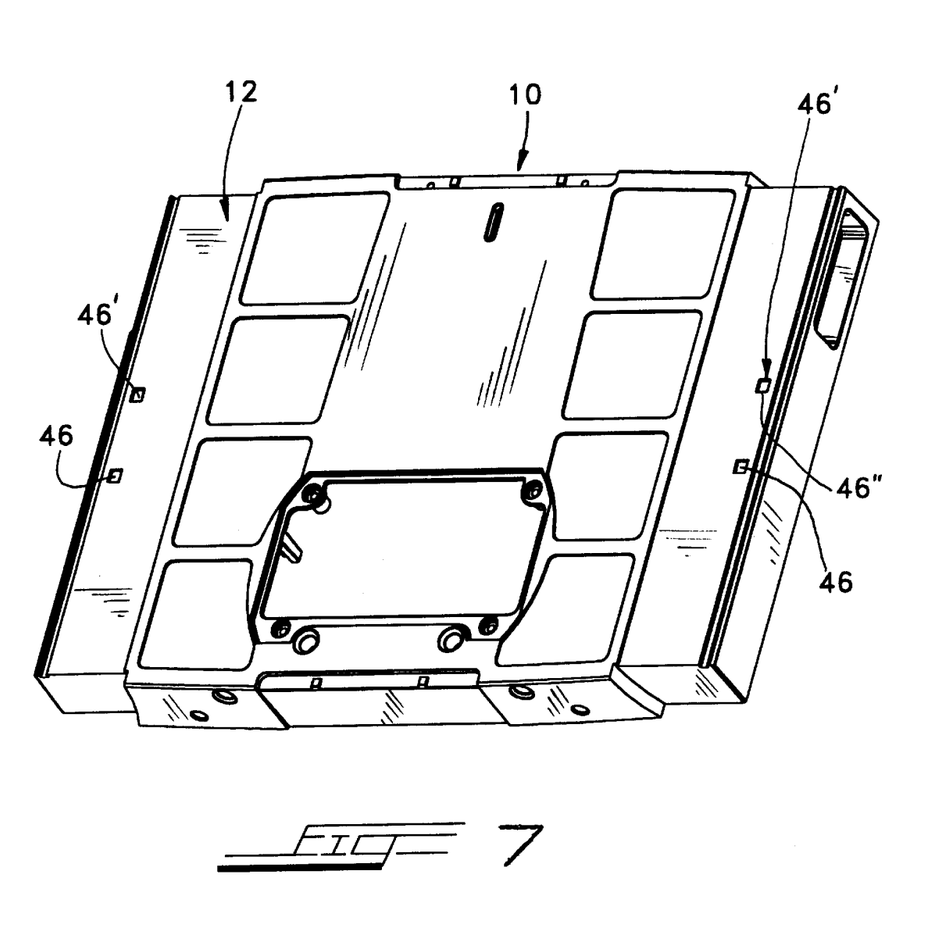
FIG. 7 is an isometric view of the bottom of the portable computer's housing showing the openings cooperating with the locking levers of the removable, outer grips of the invention.

Each inner metal casing 30 of each grip 20–26 is provided with a plurality of downwardly-projecting upper tongues 43 and a plurality of upwardly-projecting lower tongues 45. Depending upon the location of the grip, the upper tongues 43 slide in an upper lateral groove 43' or 43" formed in the upper surface of the computer housing, as seen in FIG. 2, while the lower tongues 45 slide in a a lower lateral groove 45' or 45" formed in the lower surface of the computer housing as seen in FIG. 7. This tongue-and-groove arrangement allows for easy and secure sliding on of each grip. In order to prevent each grip 20–26 from sliding off from its connection with a respective groove 43', 43", 45', or 45", each grip 20–26 has a unique locking mechanism 40 which is built into the frame/rubber over-mold combination, that cooperates with a mating portion on the housing itself. As can be seen in FIGS. 3–6, each locking mechanism 40 consists of a pivotal lever arm 42 having a main body section 44 from which protrude a first, locking protuberance or tab 46 which cooperates with an opening or cutout 46' formed in the bottom surface of the housing, as seen in FIG. 7. The tab 46 has a sloping face 47 and a vertical flat surface 47', extending from the sloping surface 47, which vertical flat surface 47' cooperates with and abuts against the inner edge 46" of a respective cooperating opening 46' of the computer housing. A second, fulcrum protuberance or tab 50 is spaced from the tab 46, which fulcrum protuberance has rounded or convex surface-portion 50' which forms a fulcrum about which the lever arm 42 may pivot. The lever arm 42 is also provided with an enlarged head-end 52 that allows the lever-arm 42 to be pivoted by depressing against the resilient, flexible neoprene outer shell, opposite the enlarged head-end 52, which causes the lever arm to pivot about the convex surface-portion 50', and to remove the tab 46 out of respective cooperating cutout in the lower surface of the computer housing, as described hereinbelow. Each lever-arm 42 is received in an appropriately-shaped cavity 60 formed in the outer rubber sleeve 32, as can best be seen in FIG. 4. The inner sheet metal frame 30 is provided with a pair of holes 54, 56 for passing therethrough the tabs 46, 50, respectively. When a grip with locking mechanism is locked to a portion of the housing, the locking tab 46 mates with a respective cooperating cutout 46' on the bottom surface of the housing, to thereby lock the grip in place. When it is desired to unlock and remove the grip, the respective lever-arm 42 is pivoted by pressing on the exterior of the neoprene outer shell opposite the enlarged head-end 52. Such pressure causes the lever arm 42 to pivot about the convex-shaped fulcrum-surface 50' in a clockwise direction when viewing FIGS. 3 and 6, to thereby remove the locking tab 46 from its cooperation in the cooperating cutout 46' on the bottom surface of the housing, to thus allow the respective grip to be slid off of the housing. The fulcrum-portion 50, when the lever arm 42 is pivoted, contacts against the surface of the computer housing juxtapositioned thereat. The biasing force for urging the locking tab 46 against the cooperating section in the bottom surface of the housing is inherently provided by the rubber or neoprene over-mold section 32 in which the locking mechanism is mounted.

The grips of the invention also provide basic contact-protection; that is, if the portable computer is resting on a desk or other non-yielding surface, on any axis thereof, the grips will be in contact with such surface. One or more grips besides grip 26 may also have a cutout to accommodate a serial, USB, mouse port, or the like, depending on user requirements.

The grips also offer a method for attaching accessory items to the portable computer in a very secure and stable manner. As an example, a small Global Positioning System (GPS) Antenna can be attached to either of the top grips 20, 22 via two small screws which are applied from the inside of the grips and attached to the bottom of the antenna. The grip is then placed on the computer housing with the GPS antenna firmly attached. The other end of the antenna may simply screw into its mating connector on the accessory unit, as set forth in detail in copending application Ser. No. 08/878,758. Another example of an exterior attachment is a pen tether, which can be attached to some of the grips. This tether would provide a solid receptacle for the pen when not in use.

While there have been shown four such removable grips for the portable computer housing, two for each side, it is possible to provide two such grips, one for each side, with any appropriate opening being formed therein.

While a specific embodiment of the invention has been shown and described, it is to be understood that numerous changes and modifications may be made therein without departing from the scope, spirit and intent of the invention as set forth in the appended claims.

What we claim is:

1. In a portable computer having a main housing comprising an upper surface, a lower surface, a first side surface, a second side surface, an top edge-surface, and a bottom edge-surface, the improvement comprising:

a plurality of exteriorly-mounted, removable grip means for mating with at least some of said surfaces of said main housing;

each said grip means comprising releasable locking means for releasably locking the respective said grip means to a portion of said main housing.

2. The portable computer according to claim 1, wherein said releasable locking means comprises a locking element, and releasing means for releasing said locking element; at least one said surface of said main housing having cooperating means for cooperating with said locking element for locking the respective said grip means to said main housing.

3. The portable computer according to claim 1, wherein said plurality of exteriorly-mounted, removable grip means comprises four said grip means, a first said grip means being mounted on said first side surface at a top portion thereof, a second said grip means being mounted on said first side surface at a bottom portion thereof, a third said grip means being mounted on said second side surface at a top portion thereof, and a fourth said grip means being mounted on said second side surface at a bottom portion thereof.

4. The portable computer according to claim 3, further comprising cooperating means in said lower surface of said computer housing in close proximity to each of said first and second side surfaces for cooperating with said locking means for locking said grip means to said main housing.

5. The portable computer according to claim 4, wherein said cooperating means comprises a first cutout and a second cutout in said lower surface of said computer housing in close proximity to said first side surface for mating with said locking means of said first and second grip means, and a third cutout and a fourth cutout in said lower surface of said computer housing in close proximity to said second side surface for mating with said locking means of said third and fourth grip means.

6. The portable computer according to claim 2, wherein said releasing means for releasing said locking element comprises a lever arm, and a fulcrum means forming part of said lever arm, said lever arm being pivotal about said fulcrum means for disengaging said locking element from said cooperating means, whereby said grip means may be removed from its connection to said housing.

7. The portable computer according to claim 1, wherein each said grip means comprises an inner structural frame, and an outer, resilient shock-absorbing element, whereby said outer shock-absorbing layer of each said grip means absorbs shock and forces when the computer is dropped.

8. The portable computer according to claim 7, wherein each said outer shock-absorbing element of each said grip means comprises a cavity for receiving a respective said locking means therein.

9. The portable computer according to claim 8, wherein each said releasable locking means comprises a locking element, and releasing means for releasing said locking element; at least one said surface of said main housing having cooperating means for cooperating with said locking element for locking the respective said grip means to said main housing, said releasing means for releasing said locking element comprising a lever arm, and a fulcrum means forming part of said lever arm, said lever arm being pivotal about said fulcrum means for disengaging said locking element from said cooperating means, whereby said grip means may be removed from its connection to said housing.

10. The portable computer according to claim 9, wherein said inner structural frame comprises at least four pairs of slots, one said pair for one said locking means; each said pair of slots passing therethrough a respective said locking element and fulcrum portion of a said locking means, whereby the respective said locking element is allowed to interact with a respective said cooperating means of said housing; said outer shock-absorbing element biasing each said locking element into locking engagement with a respective said cooperating means.

11. The portable computer according to claim 10, wherein said lever arm further comprises a head-end by which said lever arm may be pivoted about said fulcrum portion.

12. The portable computer according to claim 9, wherein said fulcrum portion and said locking element are integrally formed with said lever arm to form one piece.

13. The portable computer according to claim 3, wherein each of said grip means comprises a first, U-shaped open end by which the respective said grip means is slid onto a respective said side surface, and a second, closed end; said first open ends of said first and second grip means being in abutting engagement against each other on said first side surface, and said first open ends of said third and fourth grip means being in abutting engagement against each other on said second side surface; each said grip means comprising tongue means, and said main housing of said portable computer having a plurality of grooves formed in said upper and lower surfaces thereof in which said tongue means fit for sliding said grip means onto said main housing.

14. The portable computer according to claim 13, wherein each said second closed end is exteriorly convex-shaped in order to reduce and dissipate shock and forces upon dropping of the computer on a surface.

15. The portable computer according to claim 3, wherein said fourth grip means comprises a cutout section in operative alignment with a power harness of the housing of the computer, in order to allow access to the power harness.

16. The portable computer according to claim 1, wherein each said grip means comprises an outer shock-absorbing layer for shock-absorption and force-dissipation.

17. A removable hand-grip for use with a housing of a portable device, such as a computer, comprising:

a main body portion having a first closed end, and a second open end, said second open end being used to slide said main body portion over an edge surface of a housing of a portable device;

said main body portion comprising an inner frame, and an outer resilient, shock-absorbing jacket overlaying said inner frame;

releasable locking means for locking said main body portion to an edge-surface of a housing of a portable device;

said outer jacket comprising a seat in which is seated said locking means;

said inner frame comprising cutout means for allowing a portion of said releasable locking means seated in said seat of said outer jacket to project therethrough, in order allow the locking means to mate with a cooperating means located on the housing of the portable device.

18. The removable hand-grip for use with a housing of a portable device according to claim 17, wherein said inner frame is made of metal, and said outer jacket is made of resilient material; said outer jacket inherently providing a biasing force to said releasable locking means for urging said locking means into locking engagement with cooperating means when said main body portion is mounted to a housing of a portable device.

19. The removable hand-grip for use with a housing of a portable device according to claim 17, wherein said releasable locking means comprises a locking element, and releasing means for releasing said locking element; said releasing means for releasing said locking element comprising a lever arm, and a fulcrum means forming part of said lever arm for providing a fulcrum about which said lever arm may be pivoted, said lever arm being pivotal about said fulcrum means for disengaging said locking element from a cooperating means in a housing of a portable device when said main body portion is mounted to a housing of a portable device, whereby said fulcrum means is in abutting contact against a portion of the housing; said cutout means of said inner frame comprising a pair of cutouts through which project said fulcrum means and said locking element.

20. The removable hand-grip for use with a housing of a portable device according to claim 19, wherein said lever arm comprises a head-end for use in pivoting said lever arm about said fulcrum means, whereby upon pressing a portion of said outer jacket opposite said head-end, said head-end is forced to move in order to pivot said lever arm about said fulcrum means to thereby remove said locking element from its engagement with a cooperating means of a housing of a portable device.

21. The removable hand-grip for use with a housing of a portable device according to claim 19, in combination with a portable device, said portable device being a portable computer having a main housing; said main housing comprising cooperating means for engaging with said locking element to lock said main body portion to said main housing of said portable computer.

22. The removable hand-grip for use with a housing of a portable device according to claim 17, wherein said inner frame comprises tongue means for sliding engagement in a groove formed in one of the surfaces of a main housing of a portable computer for sliding said main body portion thereon.

23. A method of releasably securing a removable hand-grip to a housing of a portable device, such as a computer, which hand-grip comprises an inner frame and an outer resilient, shock-absorbing jacket overlaying the inner frame, and releasable locking means for locking the hand-grip to cooperating means of a portion of the housing of a portable device, said method comprising:
(a) sliding the hand-grip over an edge-surface of a housing of the portable device;
(b) releasably locking the hand-grip to the housing of the portable device by the releasable locking means;
(c) said step (b) comprising applying a biasing force to the locking means to urge the locking means into locking engagement with the cooperating means of the housing;
(d) said step of applying a biasing force being inherently performed by the outer resilient, shock-absorbing jacket overlaying the inner frame of the hand-grip.

24. The method of releasably securing a removable hand-grip to a housing of a portable device according to claim 23, wherein the releasable locking means is mounted interiorly of the outer resilient, shock-absorbing jacket and comprises a locking element, and releasing means for releasing the locking element, the releasing means for releasing the locking element comprising a pivotal lever arm, further comprising:
(e) releasing the locking means from its engagement with the cooperating means of the housing of the portable device; and
(f) after said step (e), removing the hand-grip from the housing of the portable device.

25. The method of releasably securing a removable hand-grip to a housing of a portable device according to claim 24, wherein said step (e) comprises applying manual pressure to a portion of the outer resilient, shock-absorbing jacket of the hand-grip at a portion thereof opposite an end of the lever arm of the locking means to thereby pivot the lever arm about in order to thereby remove the locking element from its engagement with a cooperating means of a housing of a portable device.

26. In a portable computer having a main housing comprising an upper surface, a lower surface, a first side surface, a second side surface, a top edge-surface, and a bottom edge-surface, the improvement comprising:
exteriorly-mounted, shock-absorbing grip means for covering at least some of said surfaces of said main housing;
said grip means being made at least partially of shock-absorbing and force-absorbing material in order to protect said main housing from falls, jolts, and shocks;
said grip means being removably mounted to said main housing to allow for the easy and fast removal of said grip means therefrom, whereby the opening up of said main housing to access the interior components mounted in said main housing may be achieved.

27. The portable computer according to claim 26, wherein said grip means comprises four said grip means, a first said grip means being mounted on said first side surface at a top portion thereof, a second said grip means being mounted on said first side surface at a bottom portion thereof, a third said grip means being mounted on said second side surface at a top portion thereof, and a fourth said grip means being mounted on said second side surface at a bottom portion thereof;
each said grip means having an open end by which the respective said grip means is slid onto the respective said side surface, each said grip means being slidably mounted on a respective said side surface for providing easy removal when access to the interior of said main housing is desired.

28. The portable computer according to claim 26, wherein said grip means comprises an inner structural frame, and an outer, resilient shock-absorbing element, whereby said outer shock-absorbing layer of each said grip means absorbs shock and forces when the computer is dropped.

29. In a portable computer having a main housing comprising an upper surface, a lower surface, a first side surface, a second side surface, a top edge-surface, and a bottom edge-surface, the improvement comprising:
exteriorly-mounted, shock-absorbing grip means for covering at least some of said surfaces of said main housing;
said grip means being made at least partially of shock-absorbing and force-absorbing material in order to protect said main housing from falls, jolts, and shocks;
said grip means comprising an inner structural frame, and an outer, resilient shock-absorbing element, whereby said outer shock-absorbing layer of each said grip means absorbs shock and forces when the computer is dropped.

30. In a portable computer having a main housing comprising an upper surface, a lower surface, a first side surface, a second side surface, a top edge-surface, and a bottom edge-surface, the improvement comprising:
exteriorly-mounted, shock-absorbing grip means for covering at least some of said surfaces of said main housing;
said grip means being made at least partially of shock-absorbing and force-absorbing material in order to protect said main housing from falls, jolts, and shocks;
said grip means comprising a first portion mounted on said first side surface, and a second portion mounted on said second side surface, each said grip means having an opening by which the respective said grip means is slid onto the respective said side surface; each said grip means being slidably mounted about a respective said side surface for providing easy removal when access to the interior of said main housing is desired.

31. The portable computer according to claim 30, wherein said first portion of said grip means comprises a first section mounted on said first side surface at a top portion thereof, a second section mounted on said first side surface at a bottom portion thereof; said second portion comprising a third section mounted on said second side surface at a top portion thereof, and a fourth section mounted on said second side surface at a bottom portion thereof; each said sections having an open end for sliding the respective said section onto the respective said side surface.

32. The portable computer according to claim 30, wherein said main housing comprises an upper section and a lower section; said grip means having a width at least equal to the width of said main housing for firmly holding together said upper and lower sections of said main housing; said grip means, when removed, allowing said upper and lower sections of said main housing to be separated for accessing interior components housed in said main housing.

\* \* \* \* \*